July 27, 1965  G. W. BAKER  3,197,554
MULTI-WIRE ELECTRICAL SYSTEM WITH IDENTIFYING MEANS
Filed Sept. 1, 1961  2 Sheets-Sheet 1

Witness
Edward P. Seeley

Inventor
Gene W. Baker
by Donald H. Zarley
Attorney

July 27, 1965 G. W. BAKER 3,197,554
MULTI-WIRE ELECTRICAL SYSTEM WITH IDENTIFYING MEANS
Filed Sept. 1, 1961 2 Sheets-Sheet 2
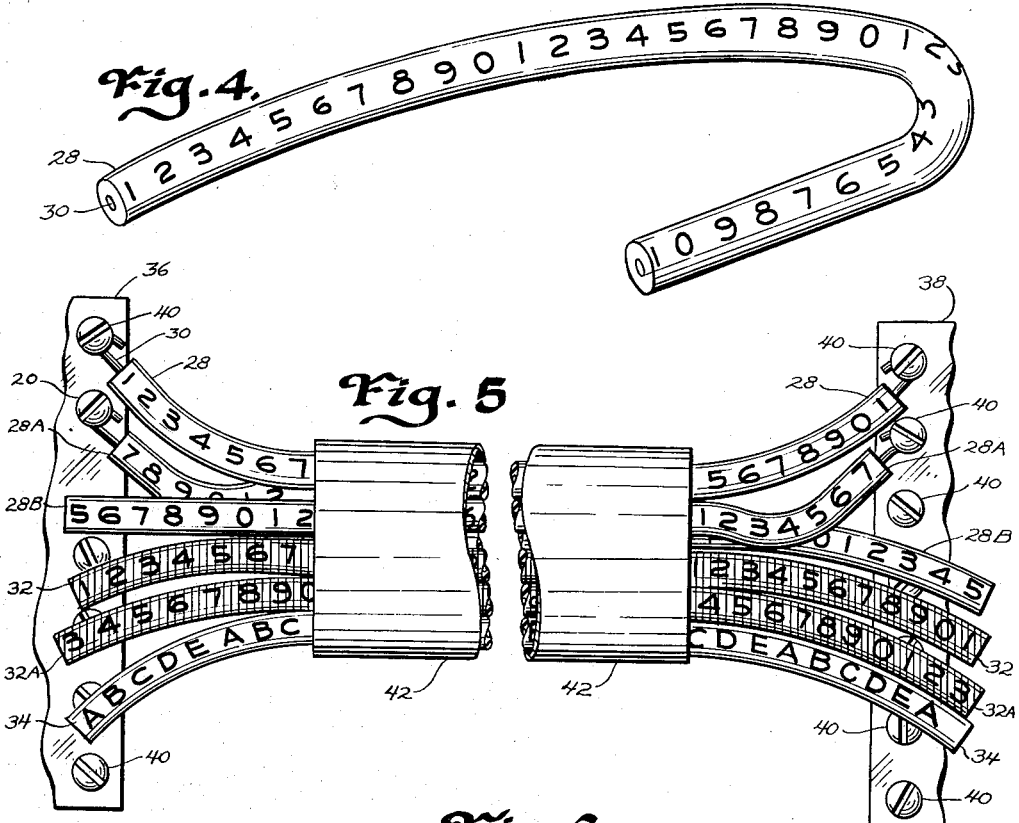
INVENTOR.
Gene W. Baker
BY
Donald H. Zarley
Attorney

United States Patent Office 3,197,554
Patented July 27, 1965

3,197,554
MULTI-WIRE ELECTRICAL SYSTEM WITH
IDENTIFYING MEANS
Gene W. Baker, 1817 76th St., Des Moines, Iowa
Filed Sept. 1, 1961, Ser. No. 136,156
12 Claims. (Cl. 174—112)

This application is a continuation-in-part of my co-pending patent applications Serial No. 815,488, filed May 25, 1959, and Serial No. 30,982, filed May 23, 1960, both of which are now abandoned. This application contains no matter not already contained in the two previous applications.

When a plurality of electrical or communication wires is pulled through a raceway or conduit, or is extended away from a control panel to different terminal destinations, it is very difficult to identify or correlate given wires by visually inspecting the ends thereof. Many times a given wire can only be identified by trial and error. One trial and error method is to connect one end of a wire to a battery terminal and then progressively connect the other ends of the wires, which may be extending through a conduit, to a light or bell. After each such connection, the light or bell is grounded and whenever the electrician has connected the bell or light to the wire which has its opposite end connected to the battery, the bell or light will be actuated. Obviously, this trial and error method is very time consuming.

Sometimes, wire with different colored insulation is used so that wires can be identified by color alone. However, a conduit or control panel may sometimes require the use of hundreds of wires, which prevents each wire from having a separate and distinct color. The use of different colored wires also makes it necessary for an electrical contractor to carry a great inventory of wire in order to have at least some of each color. Furthermore, a building that is being wired with wires of certain predetermined colors cannot be completed if the electrical contractor suddenly finds that his supply of one color of wire is depleted—even though he has an abundance of wires having other colors.

A further problem of using a plurality of wires in a given conduit or control panel is that after the wires have been properly identified for installing purposes, this identification is lost once the wire has been secured to its terminal. Thus, the electrician who must maintain and repair the installation is required to resort to the trial and error system in identifying wires whenever maintenance is required. Sometimes tags are placed on the installed wires but this operation also requires additional time. Sometimes a colored thread or a colored line is placed in the insulation of wire to distinguish it from other wires. but this merely reduces and does not eliminate the identification problem.

Therefore, the principal object of my invention is to provide a method and means for easily identifying any given wire in a multi-wire electrical system.

A further object of my invention is to provide a method and means for identifying any given wire in a multi-wire electrical system which will provide a permanent identification of the wires.

A still further object of my invention is to provide a method and means for identifying any given wire in a multi-wire electrical system that will substantially reduce the different kinds of wire required to complete a multi-wire electrical system.

A still further object of my invention is to provide a method and means for identifying any given wire in a multi-wire electrical system that will not require additional operating time to practice or use.

A still further object of my invention is to provide a means for identifying any given wire in a multi-wire electrical system which is economical of manufacture.

These and other objects will be apparent to those skilled in the art.

My invention consists in the construction, arrangements, and combination, of the various parts of the device, and the method for using same, whereby the objects contemplated are attained as hereinafter more fully set forth, specifically pointed out in my claims, and illustrated in the accompanying drawings, in which:

FIG. 4 is a perspective view of a different specie of my wire just after having been cut for installation purposes;

FIG. 5 is an elevational view of an electrical conduit extending between two terminals with a plurality of the wires of the type shown in FIG. 4 extending therethrough;

FIG. 6 is an elevational view of a different specie of my device;

FIG. 7 is an elevational view of the opposite side of a wire marked similarly to but cut differently to the wire shown in FIG. 6; and FIG. 8 is an elevational view of one side of the wire marked similarly to the wire shown in FIG. 4.

I have used the numeral 10 to generally designate the insulation material on an electro-conducting wire 11. Hereafter, all electro-conducting wires will be designated by the numeral 11 but separate numerals will be given to the insulation on each of these electro-conducting members. For simplicity, the term "wire" will be used in referring to the insulation on these various electro-conducting members.

Figure 1:
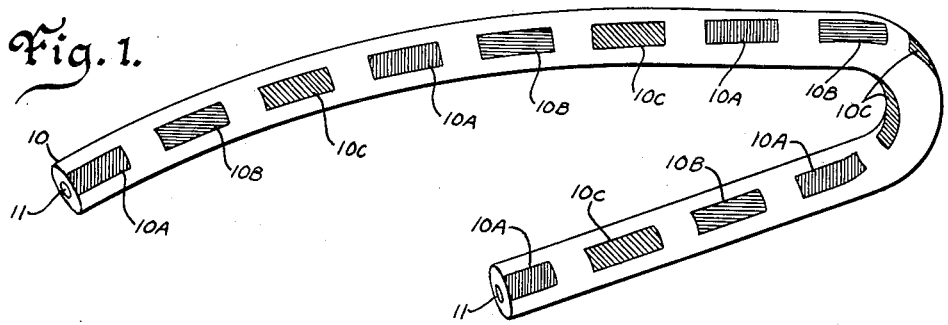
FIG. 1 is a perspective view of one of my wires just after having been cut for installation purposes.

Wire 10 can be white in color and should have a plurality of colored, elongated, rectangular bars on its outer surface as shown in FIG. 1. I have shown bars 10A, 10B and 10C progressively repeated in longitudinal alignment on both sides along the length of wire 10. The colors of bars 10A, 10B and 10C, as shown in the drawings, are red, blue and green, respectively. Obviously, other bars having other colors can be used but I have utilized these three bars 10A, 10B and 10C to illustrate the principle of my invention. I prefer that the bars be in spaced apart relation as shown in FIG. 1.

Figure 3:
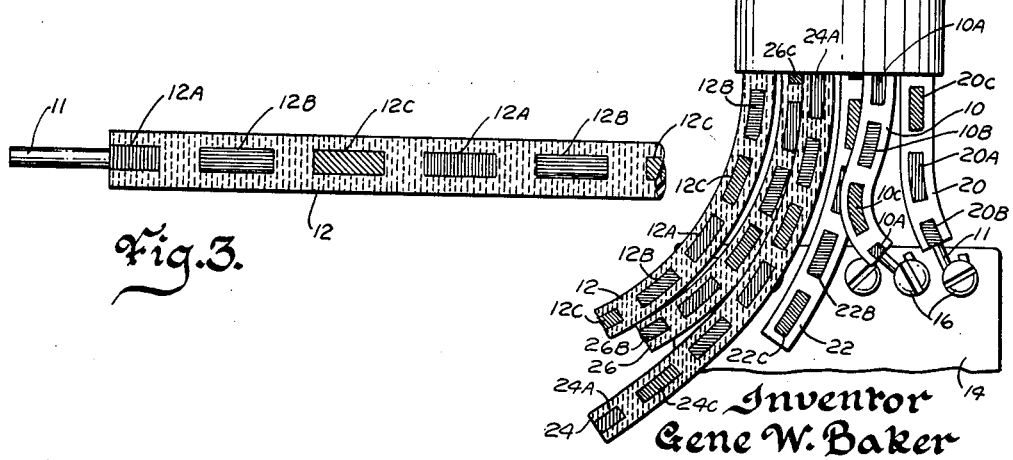
FIG. 3 is an elevational view of another of my wires having a different background color than the wire shown in FIG. 1.

A second wire 12 is shown in FIG. 3 and it is identical to wire 10 except the background color of wire 12 is purple instead of white. Red, blue and green bars, 12A, 12B and 12C, respectively, are progressively located along both sides of wire 12 in longitudinal alignment. It is apparent that other wires employing different background colors and each utilizing colored bars thereon could easily be utilized.

Figure 2:
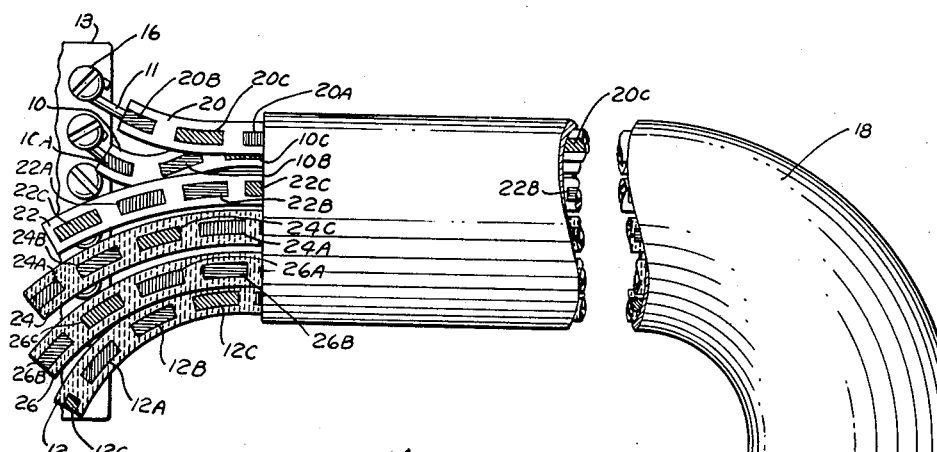
FIG. 2 is an elevational view of an eelctrical conduit extending between two terminals with a plurality of my wires extending therethrough.

In FIG. 2, I have shown electrical terminals 13 and 14 which each have a plurality of terminal connection screws 16. An electrical conduit or raceway 18 is shown to extend between terminals 13 and 14, it being understood that the terminals and conduit are supported in conventional fashion upon the structure in which they are placed. Wires 20 and 22 are shown in FIG. 2 and are substantially identical to white wire 10. Wire 20 has red, blue and green colored bars 20A, 20B and 20C, respectively, which are progressively extending along its sides in longitudinal alignment. Wire 22 has similarly colored bars 22A, 22B and 22C. Purple wires 24 and 26, which are substantially identical to wire 12, have red, blue and green bars 24A and 26A, 24B and 26B, and 24C and 26C, respectively.

The normal practice and operation of my method and means, respectively, is as follows: The electrician will measure the lineal distance that the wires are to extend. When all of the wires are to be housed in the same conduit, they all will have a length substantially equal to that of the conduit. When a plurality of wires is extending away from a multi-circuit control panel, different wires obviously will have different lengths since all are not going to the same terminal.

Referring to FIG. 1, the electrician can cut the wire 10 to any desired length and in the normal manner, will allow at least a few extra inches of wire for terminal connection purposes. However, both ends of wire 10 are cut so that the bars adjacent the cut ends are of the same color. Wire 10 is shown to have the red bars 10A adjacent the ends thereof. A second white wire, such as wire 22, can be cut from the same length of supply that wire 10 came from, but wire 22 should be cut in such a manner that like colored bars, having a color different than the red bar 10A, are adjacent the cut ends thereof. As shown in FIG. 2, wire 22 has green colored bars 22C adjacent its two cut ends. Similarly, a third wire 20 can be cut from this same supply of wire but it should have blue colored bars 20B adjacent its cut ends. After the different combinations of like colored bars on the ends of the white wires are exhausted, the electrician can begin cutting lengths of wire from a different supply of wire such as the wire having a purple background, shown in FIG. 3. The same method of having like-colored bars adjacent the cut ends of the wire should be followed.

All of the cut wires can then be inserted into and through conduit 18 or they may have one of their ends at a common terminal and their other ends at different terminals. At any rate, the electrician will always be able to find identical coloring schemes at both ends of each individual wire and each wire will have a different coloring scheme or combination than every other wire. Thus, by using only purple and white wires, with three different colored bars on each background, the system shown in FIG. 2 reveals the following combinations:

| Terminal 13 | Wire | Terminal 14 |
|---|---|---|
| White-Blue | 20 | White-Blue |
| White-Red | 10 | White-Red |
| White-Green | 22 | White-Green |
| Purple-Red | 24 | Purple-Red |
| Purple-Blue | 26 | Purple-Blue |
| Purple-Green | 12 | Purple-Green |

Obviously, the number of possible combinations could be multiplied by the number of different colored bars on each colored background, and each new colored background would even further add to the possible combinations.

After the cut wires have been installed in conduit 18, the insulation material thereon can be stripped back from wire 11 to permit the wire 11 to be secured to a terminal screw 16. If a red bar is adjacent the cut end of an "unstripped" wire, the insulation should be stripped back to a point where the last bar appearing on the insulation will be red. By this means, a permanent means of identification will always be maintained for an electrician can still identify the ends of individual wires by correlating the color combination of the bar and background insulation. Note that the wire 10 in FIG. 2 has had the insulation cut back so that a different red bar 10A is adjacent the end thereof than the red bar appearing adjacent the ends of wire 10 in FIG. 1.

With reference to FIGS. 4, 5, 6, 7 and 8, I have used the numeral 28 to generally designate the insulation material on an electro-conducting wire 30. Hereafter, all electro-conducting wires in FIGS. 4-8 will be designated by the numeral 30 but separate numerals will be given to the insulation on each of these electro-conducting members. For simplicity, the term "wire" will be used in referring to the insulation on these various electro-conducting members. Wire 28 can be white in color and can have a plurality of equi-spaced numbers printed or otherwise appearing on its opposite sides. The numbers on wire 28 should consist of groups of numbers progressively repeated along the insulation, and the numbers in the groups can be in numerical order on at least one side of the wire. Thus, it is seen in FIG. 4 that groups of numbers are progressively repeated along the length of the wire, and that the groups on at least one side of the wire consist of the numbers "0-1-2-3-4-5-6-7-8 and 9" in that order. The wire 28 in FIG. 4 has numbers printed on its opposite sides with corresponding numbers appearing diametrically opposite to each other on the two sides of the wire. Thus, the groups of numbers on this "opposite" side of the wire will read in elevation, from left to right "9-8-7-6-5-4-3-2-1 and 0." FIG. 8 shows the reverse order of the numerals in such a group on 28C.

Two second wires 32 and 32A are shown in FIG. 5 and they are identical to wire 28 except the color of the insulation on wire 32 is red instead of white. The same groups of numbers are progressively repeated in longitudinal alignment along both sides of wire 32 just as these groups appeared along the sides of wire 28. It is apparent that other wires employing different background colors and each employing these numerals could be utilized. Furthermore, it should be noted that the numerals on different wires of the same background color could have numerals of different colors printed on the respective wires. Thus, the two red wires 32 and 32A in FIG. 5 could each have their own respective numerals of a different color so that the only difference in the general appearance of the two wires would be a difference in the color of the numerals on each wire. It should be noted that the value of the numbers in the various groups on wires 28 and 32 are separated by unity, assuming that the "0" has an absolute value.

A third wire 34 is shown in FIGS. 5, 6 and 7. Wire 34 can have its insulation white but the groups of indicia marks thereon can be comprised of sequences of equi-spaced letters arranged in alphabetical order. In FIGS. 5 and 6, I have shown groups of indicia marks comprised of letters "A-B-C-D and E" progressively repeated along the length of the wires 34 and 34A. If the individual indicia marks on wire 34 are repeated on both sides thereof, as was the case with wire 28, the groups of letters would assume the reverse order of "E-D-C-B and A" on this opposite side, as depicted in FIG. 7 by wire 34B. Obviously, the groups of letters described above can be used on wires of different colored backgrounds, and, as outlined above, the letters on wires of similarly colored backgrounds could be distinguished from each other by changing the colors of the letters on different wires.

Except for the manner in which they are cut, wires 28A, 28B and 28C are identical to wire 28. The same relationship exists between wires 32 and 32A, and between wires 34, 34A and 34B. The above described groups of indicia marks can appear on both sides of the respective wires, or can appear on only one side of the wire in either their normal or reversed orders.

In FIG. 5 I have shown electrical terminals 36 and 38 which each have a plurality of terminal connection screws 40. An electrical conduit or raceway 42 is shown to extend between terminals 36 and 38, it being understood that the terminals and conduit are supported in conventional fashion upon the structure in which they are placed.

The normal operation of the species of my device shown in FIGS. 4-8 is as follows: The electrician will measure the lineal distance that the wires are to extend. When all of the wires are to be housed in the same conduit, they all will have a length substantially equal to that of the conduit. When a plurality of wires is extending away from a multi-circuit control panel, different wires obviously will have different lengths since all are not going to the same terminal.

Referring to FIG. 4, the electrician can cut the wire 28 to any desired length and in the normal manner, will allow at least a few extra inches of wire for terminal connection purposes. However, both ends of wire 28 are cut so that the numbers adjacent the cut ends are of the same value. Wire 28 is shown to have the numeral "1" adjacent the ends thereof. A second white wire, such as wire 28A can be cut from the same length of supply that wire 28 came from, but wire 28 should be cut in such a manner that like numbers having a different value than the numeral "1" are adjacent the cut ends thereof. As shown in FIG. 5, wire 28A has the numerals "7" adjacent its two cut ends. Similarly, a third wire 28B can be cut from this same supply of wire but it should have the numeral "5" adjacent its cut ends. After the different combinations of numerals of like value on the ends of the white wires are exhausted, the electrician can begin cutting lengths of wire from a different supply of wire such as the wire having a red background, such as wire 32. The same method of having numerals of like value adjacent the cut ends of the wire should be followed. If wires having the same colored background but different colored numerals were used, this additional type of wire would provide a whole new set of marking combinations. Thus, if the two red wires were both cut adjacent the numeral "3," but the "3" on the end of one wire was white and the "3" on the same end of the other wire was black, the two wires could be easily distinguished.

All of the cut wires can then be inserted into and through conduit 42 or they may have one of their ends at a common terminal and their other ends at different terminals. At any rate, the electrician will always be able to find identical coloring schemes at both ends of each individual wire and each wire will have a different numbering scheme or combination than every other wire.

The above system of identifying the opposite ends of a wire by cutting the wire adjacent similar numerals could similarly be practiced with the letters on wires 34, 34A and 34B. All possible combinations created by changing background or numeral colors, as described above, could similarly be created by use of the letters instead of numbers on wires 34, 34A and 34B. Obviously, the number of possible combinations could be multiplied by the number of different colored indicia marks on each colored background, and each new colored background would even further add to the possible combination. The lengths of the groups of letters or numbers could be lengthened if desired, but as will be seen hereafter, wire will be wasted if the length of each group is too great.

After the cut wires have been installed in conduit 42 the insulation material thereon can be stripped back from wire 30 to permit the wire 30 to be secured to a terminal screw 40. If a numeral "1" is adjacent the cut end of an "un-stripped" wire, the insulation should be stripped back to a point where the last numeral "1" appearing on the insulation appears. By this means, a permanent means of identification will always be maintained for an electrician can still identify the ends of individual wires by correlating the value of the numeral and background insulation color. Note that the wire 28A in FIG. 5 has had the insulation cut back so that a different numeral is adjacent the end thereof than the numeral "1" appearing adjacent the ends of wire 28 in FIG. 4. The same means of permanent identification can be practiced with the letters on wires 34, 34A and 34B.

I prefer to use the groups of numbers or letters on at least one side of the wires arranged in their normal sequence because a given indicia mark (numeral or letter) can be more quickly identified this way than if the marks were printed in an arbitrary sequence. One deviation from this system would be to locate the groups in their reverse order, as shown in FIGS. 7 and 8, but this is not the preferred embodiment of my invention. For purposes of this application, the term "cable" can refer to any group of wires which may extend between two terminals whether or not the wires are housed in a common insulation member or a common raceway 18 or 42. Thus, for purposes of this application, the groups of wires in FIGS. 2 and 5 could each collectively be called a "cable."

From the foregoing, it is seen that my device will accomplish at least all of its stated objectives.

Some changes may be made in my method and means for identifying wires in a multi-wire electrical system without departing from the real spirit and purpose of my invention, and it is my intention to cover by my claims, any modified forms or equivalents of my methods or structure which may be reasonably included within their scope.

I claim:

1. In a cable device of the class described, a first electro-conducting member, insulation material on said first electro-conducting member, groups of indicia marks progressively repeated along the length of said insulation material, said groups of indicia marks being similar to each other and said indicia marks within said groups being different from each other, the indicia marks adjacent the extreme outer ends of said first electro-conducting member being identical, a second electro-conducting member, insulation material on said second electro-conducting member identical to said insulation material on said first electro-conducting member, groups of indicia marks on the insulation material of said second electro-conducting member of the same character and arrangement as the groups of indicia marks on said first electro-conducting member, the indicia marks adjacent the extreme outer ends of said second electro-conducting member being identical, and the indicia marks adjacent the extreme outer ends of said first and second electro-conducting members being different.

2. The structure of claim 1 wherein the groups of indicia marks on said first and second electro-conducting members are comprised of bars having different colors.

3. The structure of claim 1 wherein the groups of indicia marks on said first and second electro-conducting members are comprised of different numbers.

4. The structure of claim 1 wherein the groups of indicia marks on said first and second electro-conducting members are comprised of different numbers arranged in numerical order.

5. The structure of claim 1 wherein the groups of indicia marks on said first and second electro-conducting members are comprised of different numbers arranged in reversed numerical order.

6. The structure of claim 1 wherein the groups of indicia marks on said first and second electro-conducting members are comprised of different letters.

7. The structure of claim 1 wherein the groups of indicia marks on said first and second electro-conducting members are comprised of different letters arranged in alphabetical order.

8. The structure of claim 1 wherein the groups of indicia marks on said first and second electro-conducting members are comprised of different letters arranged in reversed alphabetical order.

9. The structure of claim 1 wherein the insulation material on said first and second electro-conducting members is identical except in color.

10. The structure of claim 1 wherein the groups of indicia marks on said first and second electro-conducting members are comprised of different numbers with the numbers on each member being of a different color.

11. The structure of claim 1 wherein the groups of indicia marks on said first and second electro-conducting members are comprised of different letters with the letters on each member being of a different color.

12. In a cable device of the class described, a first electro-conducting member, insulation material on said first electro-conducting member, said insulation material being of integral continuous construction on said electro-conducting member, groups of indicia marks progressively repeated along the length of said insulation material, said groups of indicia marks being similar to each other and said indicia marks within said groups being different from each other, the indicia marks adjacent the extreme outer ends of said first electro-conducting member being identical, a second electro-conducting member, insulation material on said second electro-conducting member identical to said insulation material on said first electro-conducting member, groups of indicia marks on the insulation material of said second electro-conducting member of the same character and arrangement as the groups of indicia marks on said first electro-conducting member, the indicia marks adjacent the extreme outer ends of said second electro-conducting member being identical, and the indicia marks adjacent the extreme outer ends of said first and second electro-conducting members being different; said indicia marks of said electro-conducting members being integral with the exterior surface of said insulation material.

References Cited by the Examiner

FOREIGN PATENTS

| | | |
|---|---|---|
| 181,473 | 6/22 | Great Britain. |
| 194,419 | 3/23 | Great Britain. |

LARAMIE E. ASKIN, *Primary Examiner.*

JOHN WILDMAN, JOHN F. BURNS, E. JAMES SAX, *Examiners.*